Patented Apr. 27, 1943

2,317,842

UNITED STATES PATENT OFFICE 2,317,842

RESINOUS CONDENSATION PRODUCTS AND A PROCESS OF PREPARING THEM

Arthur Wolfram, Frankfort - on - the - Main-Roedelheim, and Hellmuth Jahn, Bad Soden in Taunus, Germany; vested in the Alien Property Custodian No Drawing. Application August 1, 1939, Serial No. 287,756. In Germany August 3, 1938

17 Claims. (Cl. 260—62)

The present invention relates to resinous condensation products and to a process of preparing them.

We have found that resins may be obtained by condensing an aromatic hydrocarbon with an aliphatic polymer of acetylene, such as for instance vinylacetylene, divinylacetylene, butadienylacetylene, octatrienine or the like. Products are thus obtained which are unsaponifiable and, therefore very suitable for lacquers subjected to the action of acids or caustic alkali solutions. The resins obtained by the invention are soluble in benzene hydrocarbons and can be combined for instance with chlorinated rubber. The new products are only in part soluble in alcohols.

The condensation is performed in the presence of an acid condensing agent such as aluminium chloride, ferric chloride, boron trifluoride. In order to avoid reaction of the polymers of acetylene with each other under the influence of the said condensing agent, forming thus completely insoluble products without any value, the condensing agent, for instance the aluminium chloride is preferably first entirely dissolved in the aromatic hydrocarbon, the acetylene-hydrocarbon being only then introduced. Aluminium chloride easily dissolves, for instance, in toluene, if hydrogen chloride is introduced into the mixture.

As aromatic hydrocarbons there may especially be used alkylated mononuclear hydrocarbons containing in the nucleus hydrogen capable of being substituted, for instance toluene, the xylenes, ethyl benzene, propyl benzene, butyl benzene, furthermore solvent naphtha consisting of mixtures of alkylated benzenes.

More than 1 mol of hydrocarbon is preferably used for 1 mol of the polymers of acetylene, because, as mentioned above, the catalyst must be dissolved in the hydrocarbon.

The reaction is carried through according to the conditions which are usual for Friedel-Crafts' reactions. The resin may be obtained from the reaction mixture by decomposition with water, preferably with ice, and by distilling off the aromatic hydrocarbon.

Since the polymers of acetylene are very reactive the temperature is suitably not raised too high, i. e. not above +10° C.

The following examples serve to illustrate the invention but they are not intended to limit it thereto, the parts being by weight:

1. 30 parts of pulverised aluminium chloride are added to 300 parts of toluene. Hydrogen chloride is led into the solution, at 20° C. to 30° C., while stirring. After 2 to 3 hours, the salt has completely dissolved. At a temperature of about −10° C., and in the course of one hour, 60 parts of dry divinylacetylene are dropped in and stirring is continued, at the same temperature, for 17 hours. The mixture is then decomposed by means of ice and the excess toluene is expelled with steam. 130 parts of a resin are obtained. This product dissolves entirely in benzene, toluene or the like. About 5 to 7 per cent of the resin dissolve in alcohol. The remaining part is insoluble in alcohol.

2. 30 parts of aluminium chloride are suspended in 300 parts of xylene and hydrogen chloride is introduced whereby the aluminium chloride is dissolved in two hours, at a temperature of 10° C. to 20° C. The solution is cooled to about −10° C. and 60 parts of divinylacetylene are then dropped in. The divinylacetylene is consumed only after a 10 hours' stirring. The mixture is then poured on ice and the excess of xylene is distilled in steam. A light-coloured resin is obtained which easily dissolves in aromatic hydrocarbons. Only part of it is soluble in alcohol.

3. Hydrogen chloride is introduced, at 20° C. to 30° C., into a mixture of 300 parts of solvent naphtha and 30 parts of aluminium chloride, for about 3 hours, until all of the aluminium chloride has dissolved. 50 parts of crude divinylacetylene are dropped in, at −10° C., in the course of one hour. Stirring is continued until the main part of the divinylacetylene has been consumed and the reaction mixture is then decomposed by means of ice. After distillation with steam a yellow resin remains which easily dissolves in aromatic hydrocarbons.

4. A solution is prepared as described in Example 3 from 30 parts of aluminium chloride and 300 parts of solvent naphtha, and 80 litres of monovinylacetylene are led into the solution obtained, at a temperature of −10° C., in the course of 2 to 3 hours. After 4 hours, the reaction is terminated; the mixture is poured on ice and the excess solvent is expelled by steam. A light-coloured resin is obtained which entirely dissolves in aromatic hydrocarbons.

5. About 15 grams of sublimed ferric chloride are dissolved in 300 parts of toluene. The solution is then decanted from the undissolved matter and 30 grams of crude divinylacetylene are dropped into the solution at a temperature of −10° C. After a one hour's stirring, the mass is mixed with ice and hydrochloric acid and the unaltered toluene and divinylacetylene are expelled by steam. A light-brown product is obtained which when dry partly dissolves in benzene.

We claim:

1. The process which comprises causing aliphatic polymers of acetylene containing at least one double bond besides the triple bond to act at temperatures of at most +10° C. upon an aromatic hydrocarbon in which a Friedel Crafts' acid condensation catalyst has been dissolved.

2. The process which comprises causing aliphatic polymers of acetylene containing at least one double bond besides the triple bond to act at temperatures of at most +10° C. upon an alkylated mononuclear aromatic hydrocarbon in which a Friedel Crafts' acid condensation catalyst has been dissolved.

3. The process which comprises causing divinylacetylene to act at temperatures of at most +10° C. upon an aromatic hydrocarbon in which a Friedel Crafts' acid condensation catalyst has been dissolved.

4. The process which comprises causing divinylacetylene to act at temperatures of at most +10° C. upon an alkylated mononuclear aromatic hydrocarbon in which a Friedel-Crafts' acid condensation catalyst has been dissolved.

5. The process which comprises causing divinylacetylene to act at temperatures of at most +10° C. upon an alkylated mononuclear aromatic hydrocarbon in which aluminiumchloride has been dissolved in the presence of hydrogen chloride.

6. The process which comprises causing divinylacetylene to act at temperatures of about −10° C. upon toluene containing dissolved aluminiumchloride.

7. The process which comprises causing divinylacetylene to act at temperatures of about −10° C. upon xylene containing dissolved aluminiumchloride.

8. The process which comprises causing divinylacetylene to act at temperatures of about −10° C. upon solventnaphtha containing dissolved aluminiumchloride.

9. The products according to claim 1, said products being resinous and at least partly soluble in aromatic hydrocarbons.

10. The products formed according to the process defined in claim 2, said products being resinous and at least partly soluble in aromatic hydrocarbons.

11. The products formed according to the process defined in claim 3, said products being resinous and at least partly soluble in aromatic hydrocarbons.

12. The products formed according to the process defined in claim 4, said products being resinous and at least partly soluble in aromatic hydrocarbons.

13. The products formed according to the process defined in claim 5, said products being resinous and at least partly soluble in aromatic hydrocarbons.

14. The product formed according to the process defined in claim 6, said product being resinous and soluble in aromatic hydrocarbons.

15. The product formed according to the process defined in claim 7, said product being resinous and soluble in aromatic hydrocarbons.

16. The product formed according to the process defined in claim 8, said product being resinous and soluble in aromatic hydrocarbons.

17. The process which comprises causing aliphatic polymers of acetylene containing at least one double bond besides the triple bond to act at temperatures of at most +10° C. upon a mononuclear aromatic hydrocarbon substituted by an alkyl radical of at most four carbon atoms in which a Friedel Crafts' acid condensation catalyst has been dissolved.

ARTHUR WOLFRAM.
HELLMUTH JAHN.